United States Patent [19]
Ramesh

[11] Patent Number: 6,078,626
[45] Date of Patent: Jun. 20, 2000

[54] METHODS AND SYSTEMS FOR COMMUNICATING INFORMATION USING SEPARABLE MODULATION CONSTELLATIONS

[75] Inventor: Rajaram Ramesh, Cary, N.C.

[73] Assignee: Ericsson Inc., Research Triangle Park, N.C.

[21] Appl. No.: 08/936,507

[22] Filed: Sep. 24, 1997

[51] Int. Cl.[7] .............................. H04L 5/12; H04L 27/04; H04L 27/06

[52] U.S. Cl. .......................... 375/262; 375/298; 375/341

[58] Field of Search .................................. 375/341, 262, 375/340, 261, 295, 298, 316; 332/100, 103; 329/300, 304

[56] References Cited

U.S. PATENT DOCUMENTS

| | | | |
|---|---|---|---|
| 5,134,635 | 7/1992 | Hong et al. .............................. | 375/341 |
| 5,233,629 | 8/1993 | Paik et al. ............................... | 375/262 |
| 5,432,821 | 7/1995 | Polydoros et al. ....................... | 375/340 |
| 5,541,955 | 7/1996 | Jacobsmeyer ........................... | 375/265 |
| 5,768,307 | 6/1998 | Schramm et al. ....................... | 375/208 |
| 5,809,083 | 9/1998 | Wright .................................... | 275/254 |

OTHER PUBLICATIONS

Zehavi, "8–PSK Trellis Codes for a Rayleigh Channel", IEEE Transactions on Communications, vol. 40, No. 5, May 1992, pp. 873–883.

Le Goff et al., "Turbo–Codes and High Spectral Efficiency Modulation", IEEE, 1994, pp. 645–649.

*Primary Examiner*—Tesfaldet Bocure
*Attorney, Agent, or Firm*—Myers Bigel Sibley & Sajovec

[57] ABSTRACT

A source set of bits is modulated according to a modulation constellation to produce a modulated communications signal, wherein the modulation constellation preferably is Gray-coded and is selected to provide a communications signal from the source set of bits such that real and imaginary components of the communications signal map to mutually exclusive first and second subsets of the source set of bits. The modulated communications signal is communicated over a communications channel. Soft information for the first subset of bits of the source set of bits is determined from a real component of a product of a channel transfer characteristic and the communicated modulated signal, the channel transfer characteristic characterizing communications over the communications channel. Soft information for the second subset of bits of the source set of bits is determined from an imaginary component of the product of the channel transfer characteristic and the communicated modulated signal. Iterative aspects for higher-order modulation and demodulation are also provided. Related systems and apparatus are also described.

26 Claims, 5 Drawing Sheets

METHODS AND SYSTEMS FOR COMMUNICATING INFORMATION USING SEPARABLE MODULATION CONSTELLATIONS

FIELD OF THE INVENTION

The present invention relates to communications systems and methods, more particularly, to systems and methods for modulation and demodulation of communications signals.

BACKGROUND OF THE INVENTION

Wireless communications techniques are now widely used in a variety of applications, including mobile (e.g., cellular) radiotelephones, paging systems, personal communications systems (PCS) and the like. As the demands of these applications have increased, an ever-present challenge to the implementation of wireless applications has been the need to develop improved signal processing techniques to expand the information capacity of wireless links and to improve the quality and reliability of information transfer over these wireless links.

One of the greatest challenges in wireless communications is compensating for environmentally-induced signal distortions such as fading and interference. Referring to FIG. 1, a radio communications channel 20 connects a transmitting station 10 and a receiving station 30. Components of the channel 20 can affect communications between the stations 10, 30, and include the communications medium, e.g., the atmospheric signal path across which radio communications signals are transmitted and which may introduce fading and interference into the radio communications signals. Fading may include long-term fading due to variations in terrain along the signal propagation path, as well as short-term multipath fading due to reflections from features such as buildings which cause fluctuations in received signal strength and other distortions at a receiving station. Mobile terrestrial radio communications are particularly susceptible to short-term multipath fading because the signal pathways tend to be close to the ground. Other elements which may have an effect on communications include transmitting and receiving components such as transmitters, receivers and antennas.

Various signal processing techniques are conventionally employed to deal with signal degradation over a channel, including diversity reception, signal coding, and specialized modulation/demodulation techniques which utilize estimates of a channel transfer characteristic for the channel. Diversity reception techniques included spatial diversity reception using multiple spaced-apart receiving antennas, and polarization diversity reception using multiple antennas designed to accept electromagnetic signals having particular polarizations. Typical signal coding schemes apply redundancy to enhance the accuracy of an estimate produced from a received signal. Channel estimation techniques such as pilot tone or symbol assisted modulation and demodulation can provide improved knowledge of a transfer characteristic for the channel to aid in estimating information from a received signal. The modulation/demodulation scheme implemented in the transmitting station 10 and the receiving station 30 can also influence the performance of the radiotelephone communications channel 20. Although a modulation scheme alone can provide better performance in a fading environment, conventional systems may employ a combination of coding and modulation to provide improved performance.

A commonly used combination of coding and modulation employs convolutional coding with a quadrature amplitude modulation (QAM) scheme such as 16-QAM. A source bit stream is input into a convolutional coder which produces a coded bit stream. This coded bit stream is then used to generate a communications signal by a QAM modulator which maps groups of the coded bits to signals selected from a set of signals of various amplitude and phase. The modulated signal is communicated over a communications medium to a receiving station. The received signal is demodulated by a demodulator to produce an information stream which is subsequently decoded in a convolutional decoder. To improve coding performance, it is generally desirable that the information stream produced by the demodulator is so-called "soft information," e.g., an indication of a relative probability that a bit in the source bit stream has a particular value.

Techniques for producing such soft information from a demodulator have been proposed which involve computation of a log likelihood ratio that represents a ratio of the probability that a particular bit has a "1" value to the probability that the bit has a value of "0." For example, Le Goffet al., "Turbo-Codes and High Spectral Efficiency Modulation", ICC '94 Conf. Rec., pp. 645–649, have proposed a simplified approach to computation of such log likelihood ratios using approximations based on signal-to-noise ratio (SNR) and channel characteristics, while Zehavi, "8-PSK Trellis Codes for a Rayleigh Channel," IEEE Trans. Commun., vol. 40, no. 5, May 1992, pp. 873–884, has proposed a trellis-coded modulation scheme in which soft information is computed using simplified path metrics. Unfortunately, the approximations of the former approach are based on questionable assumptions, while the latter approach generally requires a computation of an extensive set of path metrics which may pose an undesirable computational burden.

SUMMARY OF THE INVENTION

In light of the foregoing, it is an object of the present invention to provide efficient and accurate systems and methods for communicating information over a communications channel.

It is another object of the present invention to provide efficient and accurate systems and methods for modulating and demodulating communications signals.

It is yet another object of the present invention to provide efficient and accurate systems and methods for producing soft information from a QAM signal.

These and other objects, features and advantages are provided according to the present invention by systems and methods in which a source set of bits is modulated according to a separable modulation constellation, producing a communications signal which is communicated over a channel. The communicated signal is then demodulated to produce soft information for exclusive subsets of bits of the source set of bits by determining real and imaginary components of a product of the modulated signal and an estimate of a channel transfer characteristic for the channel. The present invention arises from the realization that use of a modulation constellation which maps exclusive subsets of a source set of bits to respective real and imaginary components of a signal allows use of a simplified but accurate estimate of a log likelihood ratio which can be iteratively calculated for each subset of bits in the source sequence. Because calculation of soft information is simplified, receiver complexity can be reduced.

In particular, according to the present invention, a source set of bits is modulated according to a modulation constellation to produce a modulated communications signal, wherein the modulation constellation is selected to provide a communications signal from the source set of bits such that real and imaginary components of the communications signal map to mutually exclusive first and second subsets of the source set of bits. The modulated communications signal is communicated over a communications channel. Soft information for the first subset of bits of the source set of bits is determined from a real component of a product of a channel transfer characteristic and the communicated modulated communications signal, the channel transfer characteristic characterizing communications over the communications channel. Soft information for the second subset of bits of the source set of bits is determined from an imaginary component of the product of the channel transfer characteristic and the communicated modulated communications signal. The modulation constellation preferably is Gray-coded.

The first and second subsets each may include n bits. Soft information for the first subset of bits may be computed by computing a real component of a product of a channel transfer characteristic and the communicated modulated communications signal to determine a soft information value for a first bit of the first subset of bits, and then computing a difference between a magnitude of the soft information value for the first bit of the first subset of bits and $2^{n-1}$ times a squared magnitude of the channel transfer characteristic to determine a soft information value for a second bit of the first subset of bits. Soft information for the second subset of bits may be computed by computing an imaginary component of a product of the channel transfer characteristic and the communicated modulated communications signal to determine a soft information value for a first bit of the second subset of bits, and then computing a difference between a magnitude of the soft information value for the first bit of the second subset of bits and $2^{n-1}$ times a squared magnitude of the channel transfer characteristic to determine a soft information value for a second bit of the second subset of bits. According to iterative aspects for higher-order modulation, determination of soft information for the first subset of bits may further include determining a soft information value for a kth bit of the first subset of bits by computing a difference between a magnitude of a soft information value for a k−1st bit of the first subset of bits and $2^{k-2}$ times the squared magnitude of the channel transfer characteristic, while determination of soft information for the second subset of bits may further include determining a soft information value for a kth bit of the second subset of bits by computing a difference between a magnitude of a soft information value for a k−1st bit of the second subset of bits and $2^{k-2}$ times the squared magnitude of the channel transfer characteristic.

According to other aspects, the steps of determining soft information for the first subset and determining soft information for the second subset are preceded by the step of estimating the channel transfer characteristic. The steps of determining soft information for the first subset and determining soft information for the second subset may be followed by estimating the source set of bits from the soft information for the first and second subsets of bits.

Systems and apparatus for performing the above-described functions are also described. Improved methods and systems for communicating information over a communications channel are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
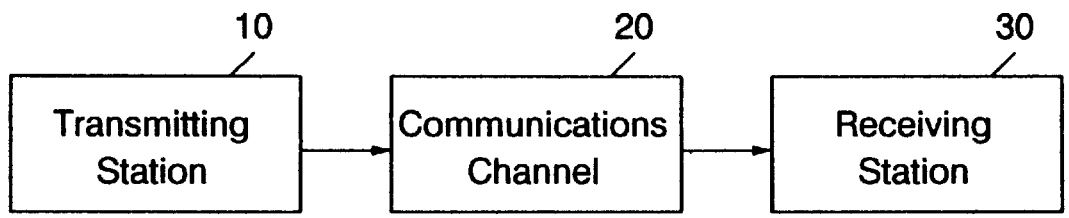
FIG. 1 is a schematic diagram illustrating a conventional communications system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Simplified Demodulation Using a Separable Modulation Constellation for 16-QAM

The following discussion provides an overview of the use of separable modulation constellations to allow for the use of simplified demodulation techniques according to the present invention. For purposes of the discussion herein, reference will be made to 16-QAM modulation which maps four-bit sets to one of 16 different signals have varying amplitude and phase. As those skilled in the art will appreciate, however, the present invention is also applicable for modulation schemes other than 16-QAM, as discussed below.

Figure 2:
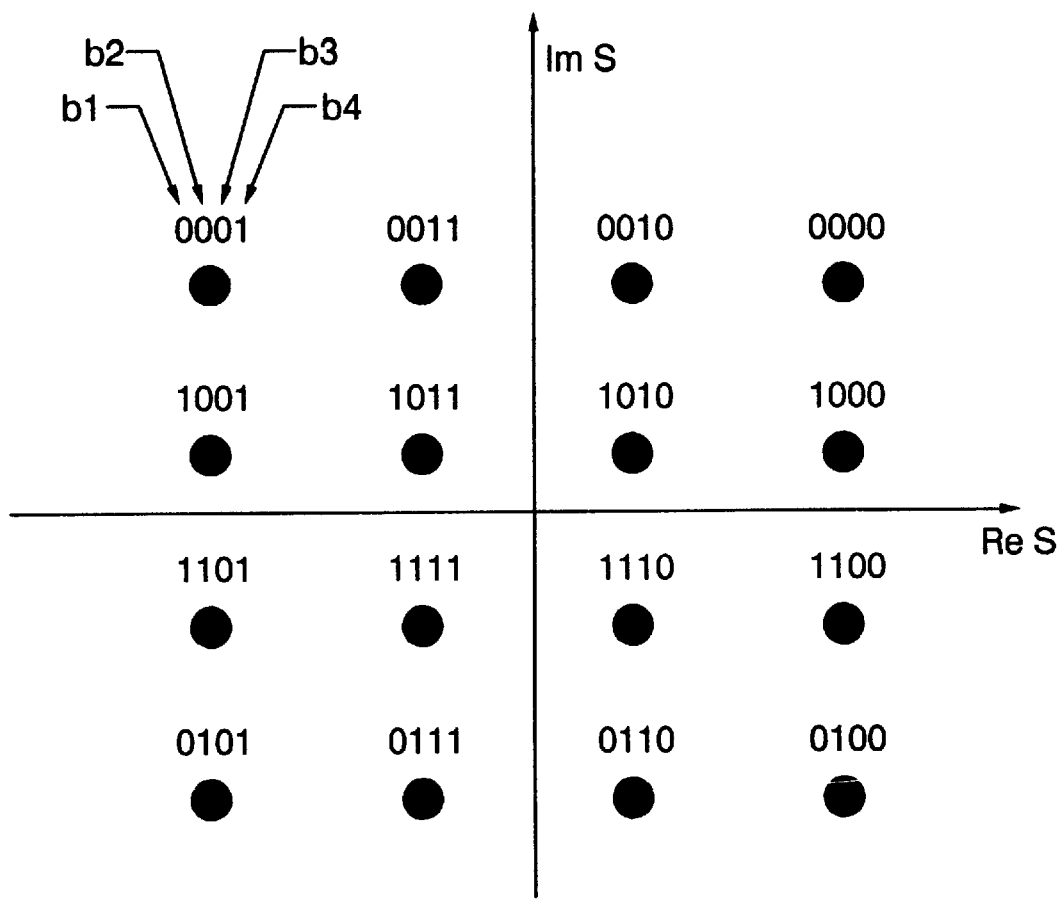
FIGS. 2–3 are diagrams illustrating modulation constellations which may be used for producing communications signals according to the present invention.

A typical modulation constellation for 16-QAM is illustrated in FIG. 2. Bits in a source set of bits are labeled $\{b_1, b_2, b_3, b_4\}$. Without loss of generality, it may be assumed that the constellation points include $\{\pm 1, \pm 3\}+j\{\pm 1, \pm 3\}$. The constellation shown is separable in the sense that two bits are constant along any row or column, and is preferably Gray-coded. Thus, the information for $b_1$ and $b_2$ is contained in the imaginary part of the constellation point, whereas the real part of the constellation point contains all the information about $b_3$, $b_4$.

Assuming that a 16-QAM signal passes through a non-dispersive fading channel and is transmitted and received using square-root raised cosine filters, a received symbol r is given by $$r=cs+n \qquad (1)$$

where c is the channel coefficient, s is the transmitted symbol and n is the noise sample, assumed to be white and Gaussian. Perfect knowledge of the channel coefficient c, which has magnitude $|c|$, and phase $\theta$, is also assumed. For a symbol $r_1$, where $$r_1 = re^{-j\theta} \quad (2)$$
$$= |c|s + ne^{-j\theta}$$
$$= |c|s + n_1,$$

and where $n_1$ is still white Gaussian noise, $r_1$ can be separated into real and imaginary parts $r_i$ and $r_q$, thus allowing demodulation to be performed two bits at a time. By decomposing equation 2 into real and imaginary parts, $$r_i = |c|x + n_I \quad (3)$$
$$r_q = |c|y + n_Q$$

may be obtained, where x and y are the real and imaginary parts of s, respectively, and $n_I$ and $n_Q$ represent real and imaginary components of the noise, respectively.

Soft information for $b_3$ and $b_4$ may be calculated using $r_i$, e.g., a log likelihood ratio for $b_4$, may be given by $$LLR(b_4) = \log\{P(b_4=1)/P(b_4=0)\} \quad (4)$$
$$= \log \frac{e^{\frac{-(ri+|c|3)^2}{2\sigma^2}} + e^{\frac{-(ri+|c|1)^2}{2\sigma^2}}}{e^{\frac{-(ri+|c|3)^2}{2\sigma^2}} + e^{\frac{-(ri+|c|1)^2}{2\sigma^2}}},$$

where $\sigma^2$ is the variance of $n_I$.

In the case in which $0 \leq r_i \leq 2|c|m$, equation 4 can be approximated by picking only the maximum term in the numerator and denominator. $LLR(b_4)$ may then be given by $$LLR(b_4) = \log \frac{e^{\frac{-(r_i+|c|1)^2}{2\sigma^2}}}{e^{\frac{-(r_i-|c|3)^2}{2\sigma^2}}} \quad (5)$$
$$= \frac{-2|c|r_i}{\sigma^2}.$$

In the case in which $r_i \geq 2|c|$, using the same approximation, $LLR(b_4)$ may be expressed as $$LLR(b_4) = \log \frac{e^{\frac{-(r_i+|c|1)^2}{2\sigma^2}}}{e^{\frac{-(r_i-|c|3)^2}{2\sigma^2}}} \quad (6)$$
$$= \frac{4|c|^2 - 4|c|r_i}{\sigma^2}.$$

Similarly, for $-2|c| \leq r_i \leq 0$, $LLR(b_4)$ may be expressed as $$LLR(b_4) = \frac{2|c|r_i}{\sigma^2}. \quad (7)$$

For $r_i \leq -2|c|$, $LLR(b_4)$ may be expressed as $$LLR(b_4) = \frac{-4|c|^2 - 4|c|r_i}{\sigma^2}. \quad (8)$$

Because it is generally more important to have better soft information at low signal to noise ratios, a further approximation can be made, yielding:

$$LRR(b_4) = \frac{2|c|r_i}{\sigma^2} \quad (9)$$

For $b_3$, the log-likelihood ratio is given by:

$$LLR(b_3) = \log\{P(b_3=1)/P(b_3=0)\} \quad (10)$$
$$= \log \frac{e^{\frac{-(r_i+|c|1)^2}{2\sigma^2}} + e^{\frac{-(r_i+|c|1)^2}{2\sigma^2}}}{e^{\frac{-(r_i+|c|3)^2}{2\sigma^2}} + e^{\frac{-(r_i+|c|3)^2}{2\sigma^2}}}.$$

For $r_i \geq 0$, this equation may be approximated by only taking the maximum term in the numerator and the denominator to obtain:

$$LLR(b_3) = \frac{4|c|^2 - 2|c|r_i}{\sigma^2}. \quad (11)$$

For $r_i \leq 0$, $LLR(b_3)$ may be expressed as $$LLR(b_3) = \frac{4|c|^2 + 2|c|r_i}{\sigma^2} \quad (12)$$

or $$LLR(b_3) = \frac{4|c|^2 - 2|c||r_i|}{\sigma^2}, \quad (13)$$

where $$|c|r_i = \text{Real}\{|c|e^{j\theta}r_i\} \quad (14)$$
$$= \text{Real}\{c^*r_i\}.$$

Thus, soft information values for $b_3$ and $b_4$ may be given by:

$$LLR(b_3) = \frac{4|c|^2 - 2|\text{Real}\{c^*r_i\}|}{\sigma^2}, \quad (15)$$
$$LLR(b_4) = \frac{-2\text{Real}\{c^*r_i\}}{\sigma^2}.$$

Similarly, it can be shown that $$LLR(b_1) = \frac{4|c|^2 - 2|\text{Imag}\{c^*r_i\}|}{\sigma^2}, \quad (16)$$
$$LLR(b_2) = \frac{-2\text{Imag}\{c^*r_i\}}{\sigma^2}$$

If this soft information is fed to a convolutional decoder, the scaling by the variance $\sigma^2$ may be disregarded as all path metrics typically are scaled by the same factor.

Figure 3:
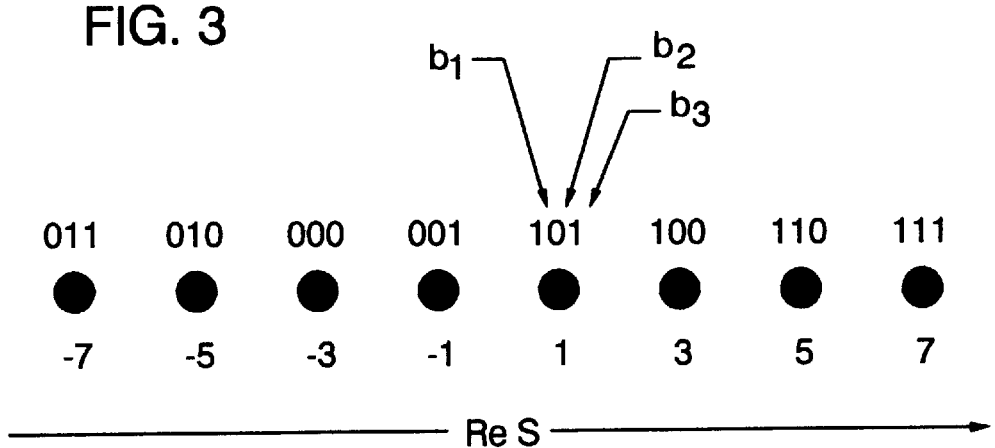

The approximations described above for 16-QAM can be extended to $2^{2n}$-QAM constellations such as 64-QAM, assuming a Gray coded separable mapping with bits $b_1$, $b_2 \ldots b_n$ mapping to the real part of a constellation point and bits $b_{n+1}, \ldots b_{2n}$, mapping to the imaginary part. An example of the real part of the constellation is shown in FIG. 3.

For such a constellation, estimates of the soft information may be given by $$LLR(b_1) = \text{Real}\{c^*r\}; \quad (17)$$

-continued $$LLR(b_2) = |\text{Real}\{c^*r\}| - 2^{n-1}|c|^2;$$

$$LLR(b_k) = |LLR(b_{k-1})| - 2^{k-2}|c|^2, k = 3, \ldots n;$$

$$LLR(b_{n+1}) = \text{Imag}\{c^*r\};$$

$$LLR(b_{n+2}) = |\text{Imag}\{c^*r\}| - 2^{n-1}|c|^2;$$

$$LLR(b_{n+k}) = |LLR(b_{n+k-1})| - 2^{k-2}|c|^2, k = 3, \ldots n.$$

Implementation of Separable Modulation/Demodulation

Figure 4:
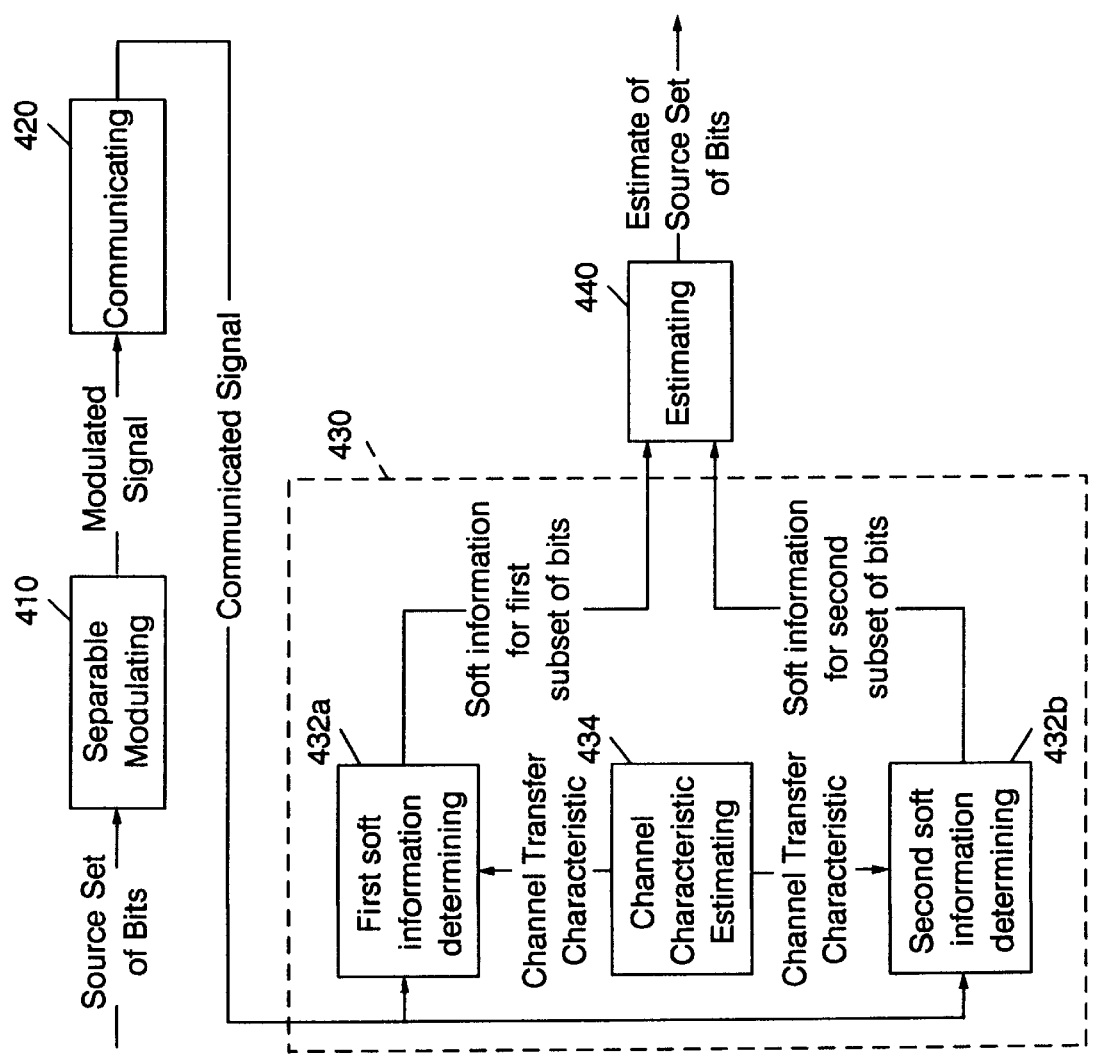
FIG. 4 is a schematic block diagram illustrating a communications system according to the present invention.

A communications system employing the above-described separable modulation and demodulation techniques according to the present invention is depicted in FIG. 4. Separable modulating means 410 produces a modulated signal from a source set of bits according to a separable modulation constellation which maps mutually exclusive subsets of the source set of bits to respective real and imaginary components of the output signal, e.g., a constellation such as that illustrated in FIG. 2. The modulated signal is communicated over a communications channel by communicating means 420, which may induce fading and other channel effects. Demodulating means 430 includes first soft information determining means 432a for determining soft information for a first subset of the source set of bits from a real component of a product of the communicated signal and a channel transfer characteristic. The channel transfer characteristic may be estimated by channel characteristic estimating means 434, such as a channel estimator which uses pilot tones or pilot symbols. Second soft information determining means 432b determines soft information for a second subset of bits of the source set of bits from an imaginary component of a product of the communicated signal and the channel transfer characteristic. The soft information for the first and second subset may then be passed to estimating means 440 which estimates the source set of bits from the soft information.

Those skilled in the art will appreciate that the apparatus illustrated in FIG. 4 may be implemented using a variety of commonly-used communications components. For example, the separable modulating means 410 may be implemented using modulation circuitry as is commonly used in communications devices such as cellular radiotelephones, satellite transceivers, and the like. Those skilled in the art will appreciate that the communicating means 420 may include elements commonly found in a communications path, including transmitters, antennas, filters, sampling devices, analog-to-digital (A/D) converters and the like, as well as a communications medium over which communications signals may be communicated, e.g., an airlink, wire or similar medium. The demodulating means 430 and the estimating means 440 may include signal processing circuitry such as filters, as well as data processing hardware such as digital signal processors (DSPs), microprocessors, and the like, the operation of which is well known to those of skill in the art and need not be discussed in detail herein. Those skilled in the art will appreciate that the apparatus of the present invention generally may be implemented using special-purpose hardware, software or firmware running on special-purpose or general-purpose data processors, and combinations thereof. For example, functions of the demodulating and estimating means may be implemented using a digital signal processing (DSP) chip or an application-specific integrated circuit (ASIC).

Figure 5:
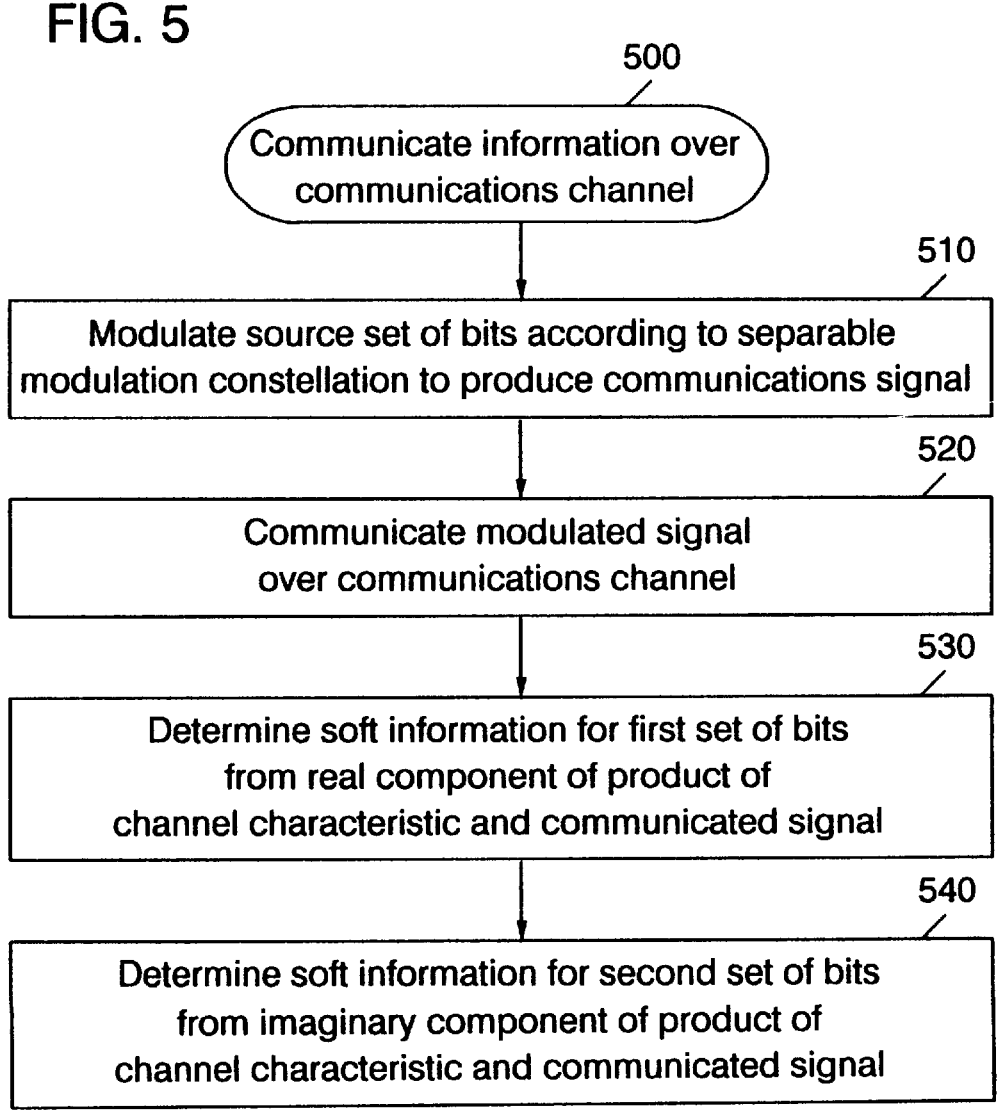
FIG. 5 is a flowchart illustration of operations for communicating information over a communications channel according to the present invention.
Figure 6:
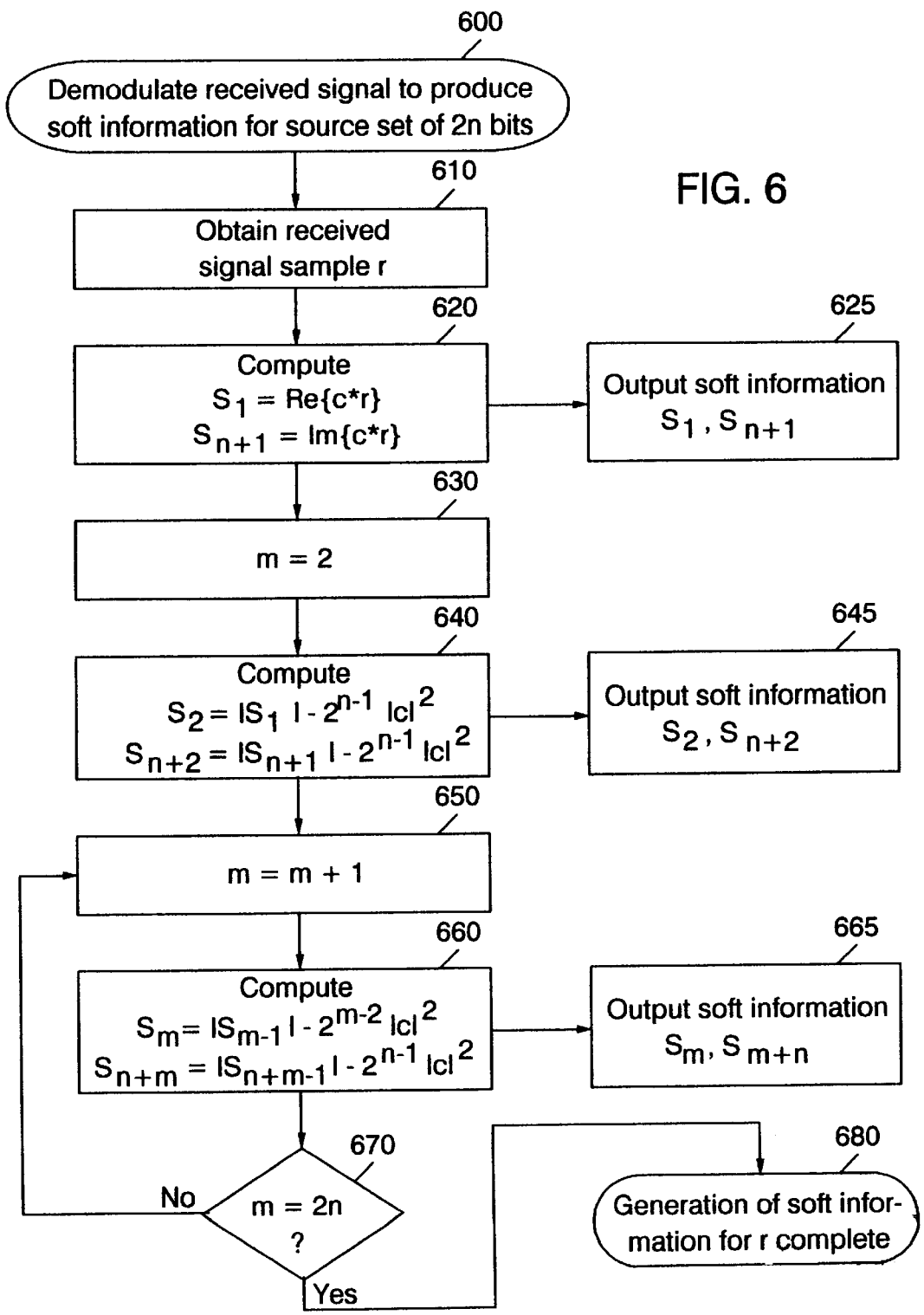
FIG. 6 is a flowchart illustration of detailed operations for demodulating a communications signal according to the present invention.

FIGS. 5 and 6 are flowchart illustrations of methods and apparatus (systems) according to the invention. It will be understood that each block of the flowchart illustrations, and combinations of blocks in the flowchart illustrations, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustration support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 5 illustrates operations for communicating information over a communications channel according to the present invention (Block 500). A source set of bits is modulated according to a modulation constellation which is separable as described above to produce a modulated signal (Block 510) which is then communicated over the communications channel (Block 520). Soft information for a first subset of the source set of bits is determined from a real component of a product of the communicated signal and a channel transfer characteristic for the channel (Block 530). Soft information for a second subset of the source set of bits is determined from an imaginary component of a product of the communicated signal and a channel transfer characteristic for the channel (Block 530).

Detailed operations for determining soft information for a source set of bits including first and second subsets of n bits according to an aspect of the present invention are illustrated in FIG. 6 (Block 600). A signal sample is obtained (Block 610), and soft information $S_1$ for a first bit of the first subset of bits and soft information $S_{n-1}$ for a first bit of the second subset of bits is computed (Block 620) and output (Block 625). After a counter is set to an initial value of 2 (Block 630), soft information for the next bits of the first and second subsets are computed using the previously computed soft information (Block 640) and output (Block 645). For a general M-ary modulation, recursive computations (Blocks 650–670) are performed. The counter is incremented (Block 650), after which soft information values for bits of the first and second subsets are computed (Block 660) and output (Block 665). As long as the counter value is less than 2n (Block 670), the counter is incremented and soft information values are produced until soft information values have been generated for all of the 2n bits of the source sequence (Block 680).

Figure 7:
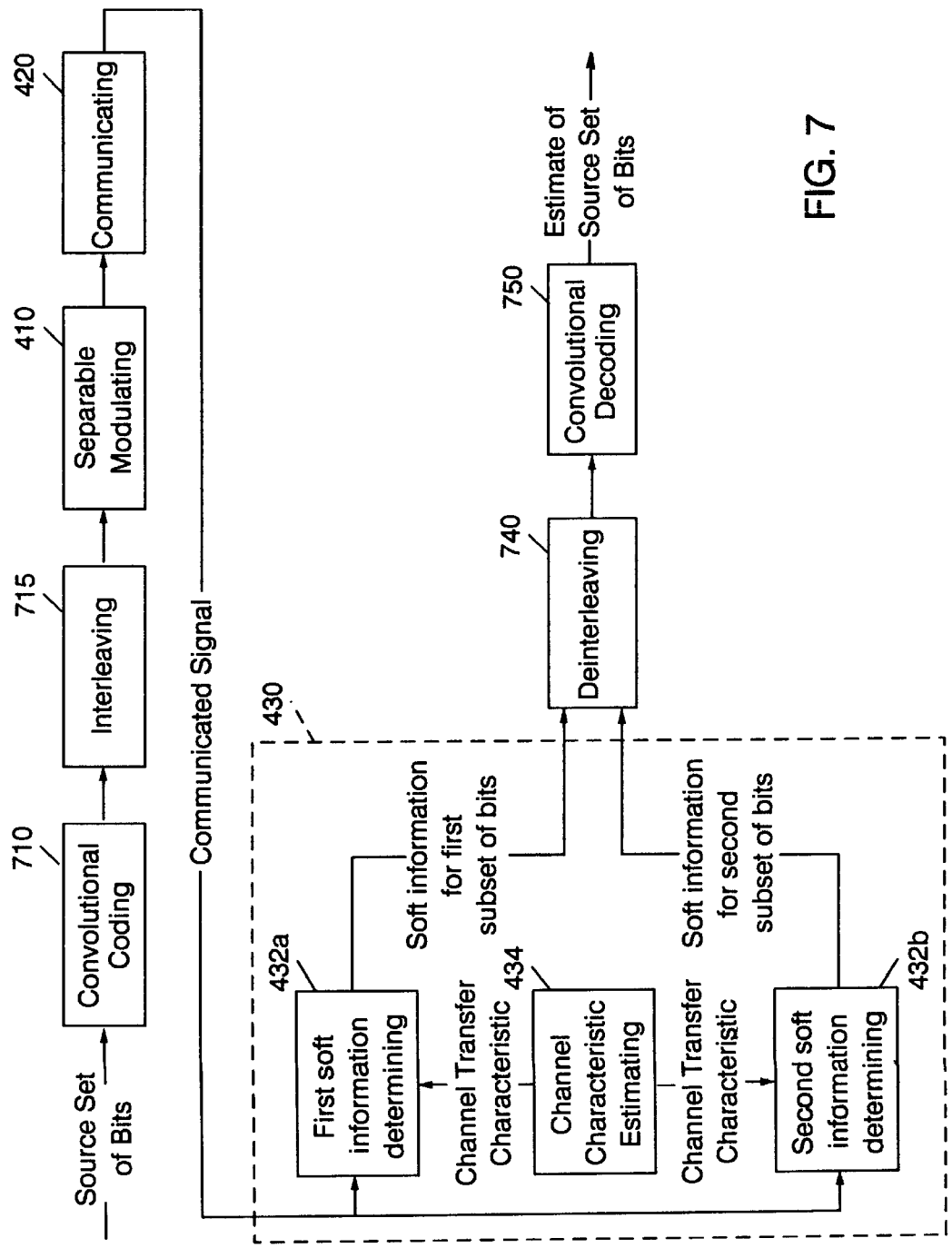
FIG. 7 is a schematic block diagram illustrating an embodiment of a communications system according to the present invention.

FIG. 7 illustrates a preferred embodiment of a communications system according to the present invention. Convolutional coding means 710 encode a source set of bits according to a convolution code, with the bit stream so produced being next interleaved by interleaving means 715. The interleaved set of bits is then modulated according to a separable modulation constellation in the separable modulating means 410 and communicated over the communications channel 420 for demodulation by the demodulating means 430. After generation of soft information for first and second subsets of bits of the coded and interleaved bit stream as described above in reference to FIG. 4, the soft information may then be deinterleaved by deinterleaving means 740 and decoded according to the convolutional code in convolutional decoding means 750. Those skilled in the art will appreciate that the coding, decoding, interleaving and deinterleaving means may be implemented using special-purpose hardware, software or firmware running on a special-purpose or general purpose data processor, or combinations thereof. For example, these functions may be implemented using a DSP chip or an ASIC.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of communicating information over a communications channel, the method comprising the steps of:

modulating a source set of bits according to a modulation constellation to produce a modulated communications signal, wherein the modulation constellation is selected such that real and imaginary components of the modulated communications signal map to mutually exclusive first and second subsets of the source set of bits;

communicating the modulated communications signal over the communications channel;

determining soft information for the first subset of bits of the source set of bits from a real component of a product of a channel transfer characteristic and the communicated modulated communications signal, the channel transfer characteristic characterizing communications over the communications channel; and determining soft information for the second subset of bits of the source set of bits from an imaginary component of the product of the channel transfer characteristic and the communicated modulated communications signal.

2. A method according to claim 1, wherein the modulation constellation comprises a Gray-coded modulation constellation.

3. A method according to claim 1, wherein the first and second subsets each include n bits, and wherein said step of determining soft information for the first subset of bits comprises the steps of:

computing the real component of a product of a channel transfer characteristic and the communicated modulated communications signal to determine a soft information value for a first bit of the first subset of bits; and computing a difference between a magnitude of the soft information value for the first bit of the first subset of bits and $2^{n-1}$ times a squared magnitude of the channel transfer characteristic to determine a soft information value for a second bit of the first subset of bits.

4. A method according to claim 3, wherein said step of determining soft information for the second subset of bits comprises the steps of:

computing the imaginary component of a product of the channel transfer characteristic and the communicated modulated communications signal to determine a soft information value for a first bit of the second subset of bits; and computing a difference between a magnitude of the soft information value for the first bit of the second subset of bits and $2^{n-1}$ times a squared magnitude of the channel transfer characteristic to determine a soft information value for a second bit of the second subset of bits.

5. A method according to claim 4:

wherein said step of determining soft information for the first subset of bits further comprises the step of determining a soft information value for a kth bit of the first subset of bits by computing a difference between a magnitude of a soft information value for a k−1st bit of the first subset of bits and $2^{k-2}$ times the squared magnitude of the channel transfer characteristic; and wherein said step of determining soft information for the second subset of bits further comprises the step of determining a soft information value for a kth bit of the second subset of bits by computing a difference between a magnitude of a soft information value for a k−1st bit of the second subset of bits and $2^{k-2}$ times the squared magnitude of the channel transfer characteristic.

6. A method according to claim 1, wherein said step of determining soft information for the first subset and said step of determining soft information for the second subset are preceded by the step of estimating the channel transfer characteristic.

7. A method according to claim 1, wherein said step of determining soft information for the first subset and said step of determining soft information for the second subset are followed by a step of estimating the source set of bits from the soft information for the first and second subsets of bits.

8. A method of demodulating a communications signal representing a source set of bits modulated according to a modulation constellation which is selected such that real and imaginary components of the communications signal map to mutually exclusive first and second subsets of the set of bits, the method comprising the steps of:

receiving the communications signal over a communications channel;

determining soft information for the first subset of bits of the source set of bits from a real component of a product of a channel transfer characteristic and the received communications signal; and determining soft information for the second subset of bits of the source set of bits from an imaginary component of the product of the channel transfer characteristic and the received communications signal.

9. A method according to claim 8, wherein the modulation constellation comprises a Gray-coded modulation constellation.

10. A method according to claim 8, wherein the first and second subsets each include n bits, and wherein said step of determining soft information for the first subset of bits comprises the steps of:

computing the real component of a product of a channel transfer characteristic and the received communications signal to determine a soft information value for a first bit of the first subset of bits; and computing a difference between a magnitude of the soft information value for the first bit of the first subset of bits and $2^{n-1}$ times a squared magnitude of the channel transfer characteristic to determine a soft information value for a second bit of the first subset of bits.

11. A method according to claim 10, wherein said step of determining soft information for the second subset of bits comprises the steps of:

computing the imaginary component of a product of the channel transfer characteristic and the received communications signal to determine a soft information value for a first bit of the second subset of bits; and computing a difference between a magnitude of the soft information value for the first bit of the second subset of bits and $2^{n-1}$ times a squared magnitude of the channel transfer characteristic to determine a soft information value for a second bit of the second subset of bits.

12. A method according to claim 11:

wherein said step of determining soft information for the first subset of bits further comprises the step of determining a soft information value for a kth bit of the first subset of bits by computing a difference between a magnitude of a soft information value for a k−1st bit of the first subset of bits and $2^{k-2}$ times the squared magnitude of the channel transfer characteristic; and wherein said step of determining soft information for the second subset of bits further comprises the step of determining a soft information value for a kth bit of the second subset of bits by computing a difference between a magnitude of a soft information value for a k−1st bit of the second subset of bits and $2^{k-2}$ times the squared magnitude of the channel transfer characteristic.

13. A method according to claim 8, wherein said step of determining soft information for the first subset and said step of determining soft information for the second subset are preceded by the step of estimating the channel transfer characteristic.

14. A method according to claim 8, wherein said step of determining soft information for the first subset and said step of determining soft information for the second subset are followed by a step of estimating the source set of bits from the soft information for the first and second subsets of bits.

15. A system for communicating information over a communications channel, the system comprising:

separable modulating means for modulating a source set of bits according to a modulation constellation to produce a modulated communications signal, wherein the modulation constellation is selected such that real and imaginary components of the modulated communications signal map to mutually exclusive first and second subsets of the source set of bits;

communicating means, responsive to said separable modulating means, for communicating the modulated communications signal over the communications channel;

first soft information determining means, responsive to said communicating means, for determining soft information for the first subset of bits of the source set of bits from a real component of a product of a channel transfer characteristic and the communicated modulated communications signal, the channel transfer characteristic characterizing communications over the communications channel; and second soft information determining means, responsive to said communicating means, for determining soft information for the second subset of bits of the source set of bits from an imaginary component of the product of the channel transfer characteristic and the communicated modulated communications signal.

16. A system according to claim 15, wherein the modulation constellation comprises a Gray-coded modulation constellation.

17. A system according to claim 16, wherein the first and second subsets each include n bits, and:

wherein said first soft information determining means comprises:

means for computing the real component of a product of a channel transfer characteristic and the communicated modulated communications signal to determine a soft information value for a first bit of the first subset of bits; and means for computing a difference between a magnitude of the soft information value for the first bit of the first subset of bits and $2^{n-1}$ times a squared magnitude of the channel transfer characteristic to determine a soft information value for a second bit of the first subset of bits; and wherein said second soft information determining means comprises:

means for computing the imaginary component of a product of the channel transfer characteristic and the communicated modulated communications signal to determine a soft information value for a first bit of the second subset of bits; and means for computing a difference between a magnitude of the soft information value for the first bit of the second subset of bits and $2^{n-1}$ times a squared magnitude of the channel transfer characteristic to determine a soft information value for a second bit of the second subset of bits.

18. A system according to claim 17:

wherein said first soft information determining means comprises means for determining a soft information value for a kth bit of the first subset of bits by computing a difference between a magnitude of a soft information value for a k−1st bit of the first subset of bits and $2^{k-2}$ times the squared magnitude of the channel transfer characteristic; and wherein said second soft information determining means comprises means for determining a soft information value for a kth bit of the second subset of bits by computing a difference between a magnitude of a soft information value for a k−1st bit of the second subset of bits and $2^{k-2}$ times the squared magnitude of the channel transfer characteristic.

19. A system according to claim 15, further comprising means for estimating the channel transfer characteristic.

20. A system according to claim 15, further comprising means, responsive to said first soft information determining means and to said second soft information determining means, for estimating the source set of bits from the soft information for the first and second subsets of bits.

21. An apparatus for demodulating a received communications signal representing a source set of bits modulated according to a modulation constellation which is selected such that real and imaginary components of the communications signal map to mutually exclusive subsets of the set of bits, the apparatus comprising:

first soft information determining means, responsive to the communications channel, for determining soft information for the first subset of bits of the source set of bits from a real component of a product of a channel transfer characteristic and the received communications signal; and second soft information determining means, responsive to the channel, for determining soft information for the second subset of bits of the source set of bits from an imaginary component of the product of the channel transfer characteristic and the received communications signal.

22. An apparatus according to claim 21, wherein the modulation constellation comprises a Gray-coded modulation constellation.

23. An apparatus according to claim 21, wherein the first and second subsets each include n bits, and:

wherein said first soft information determining means comprises:
  means for computing the real component of a product of a channel transfer characteristic and the received communications signal to determine a soft information value for a first bit of the first subset of bits; and
  means for computing a difference between a magnitude of the soft information value for the first bit of the first subset of bits and $2^{n-1}$ times a squared magnitude of the channel transfer characteristic to determine a soft information value for a second bit of the first subset of bits; and
wherein said second soft information determining means comprises:
  means for computing the imaginary component of a product of the channel transfer characteristic and the received communications signal to determine a soft information value for a first bit of the second subset of bits; and
  means for computing a difference between a magnitude of the soft information value for the first bit of the second subset of bits and $2^{n-1}$ times a squared magnitude of the channel transfer characteristic to determine a soft information value for a second bit of the second subset of bits.

24. An apparatus according to claim 23:
wherein said first soft information determining means comprises means for determining a soft information value for a kth bit of the first subset of bits by computing a difference between a magnitude of a soft information value for a k−1st bit of the first subset of bits and $2^{k-2}$ times the squared magnitude of the channel transfer characteristic; and
wherein said second soft information determining means comprises means for determining a soft information value for a kth bit of the second subset of bits by computing a difference between a magnitude of a soft information value for a k−1st bit of the second subset of bits and $2^{k-2}$ times the squared magnitude of the channel transfer characteristic.

25. An apparatus according to claim 21, further comprising means for estimating the channel transfer characteristic.

26. An apparatus according to claim 21, further comprising means, responsive to said first soft information determining means and to said second soft information determining means, for estimating the source set of bits from the soft information for the first and second subsets of bits.

* * * * *